(12) United States Patent
Stray et al.

(10) Patent No.: US 7,190,505 B1
(45) Date of Patent: Mar. 13, 2007

(54) ELECTROCHROMIC DEVICE HAVING AN IMPROVED FILL PORT PLUG

(75) Inventors: Joel A. Stray, Hudsonville, MI (US); William L. Tonar, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/391,594

(22) Filed: Mar. 28, 2006

(51) Int. Cl.
*G02B 1/15* (2006.01)

(52) U.S. Cl. ............... 359/265; 359/267; 359/238

(58) Field of Classification Search ........... 359/265, 359/237, 238, 241, 266, 267, 273
See application file for complete search history.

(56) References Cited

U.S. PATENT DOCUMENTS

| | | |
|---|---|---|
| 4,902,108 A | 2/1990 | Byker |
| 5,790,298 A | 8/1998 | Tonar |
| 5,928,572 A | 7/1999 | Tonar et al. |
| 5,940,201 A | 8/1999 | Ash et al. |
| 6,157,480 A | 12/2000 | Anderson et al. |
| 6,188,505 B1 | 2/2001 | Lomprey et al. |
| 6,193,378 B1 | 2/2001 | Tonar et al. |
| 6,195,193 B1 | 2/2001 | Anderson et al. |
| 6,714,334 B2 | 3/2004 | Tonar |
| 6,842,276 B2 | 1/2005 | Poll et al. |

*Primary Examiner*—Timothy Thompson
(74) *Attorney, Agent, or Firm*—King & Partners, PLC

(57) ABSTRACT

An electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; (d) wherein the chamber comprises a plug associated with a fill port; and (e) wherein the plug is at least partially cured with and/or comprises a phosphine oxide photo initiator.

57 Claims, 1 Drawing Sheet

ELECTROCHROMIC DEVICE HAVING AN IMPROVED FILL PORT PLUG

CROSS-REFERENCE TO RELATED APPLICATIONS

Not applicable

BACKGROUND OF THE INVENTION

1. Field of the Invention

The present invention relates in general to electrochromic devices and, more particularly, to an electrochromic device having a chamber comprising a plug associated with a fill port, wherein the plug is at least partially cured with a phosphine oxide photo initiator to, in turn, improve curability and/or reliability of the same.

2. Background Art

Electrochromic devices have been known in the art for several years. Furthermore, electrochromic devices having plugs associated with fill ports are likewise well known.

Although such fill port plugs have been readily utilized, issues relative to plug curability and/or reliability remain paramount to the commercialized success of electrochromic devices, such as, for example, vehicular rearview electrochromic mirrors. Indeed, incomplete plug curing and/or failure can not only render an associated electrochromic device inoperable, but leakage of the electrochromic medium contained within the electrochromic device can also substantially damage the interior of an automobile—the owners and/or manufacturers of which can be completely intolerable of such an occurrence.

It has now been surprisingly discovered that selective incorporation of one or more phosphine oxide photo initiators into the fill port plug formulation facilitates a more complete cure of the same, which, in turn, increases plug curability and/or reliability towards minimization and/or elimination of plug failure.

It is therefore an object of the present invention, among other objects, to provide an electrochromic device that remedies the aforementioned detriments and/or complications associated with the use of conventional fill port plugs.

SUMMARY OF THE INVENTION

The present invention is directed to an electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; (d) wherein the chamber comprises a plug associated with a fill port; and (e) wherein the plug comprises a phosphine oxide.

The present invention is further directed to an electrochromic device, comprising: (a) a first substantially transparent substrate having an electrically conductive material associated therewith; (b) a second substrate having an electrically conductive material associated therewith; (c) an electrochromic medium contained within a chamber positioned between the first and second substrates which comprises: (1) at least one solvent; (2) at least one anodic material; and (3) at least one cathodic material, wherein both of the anodic and cathodic materials are electroactive and at least one of the anodic and cathodic materials is electrochromic; (d) wherein the chamber comprises a plug associated with a fill port; and (e) wherein the plug is at least partially cured with a phosphine oxide photo initiator.

In a preferred embodiment of the present invention, the phosphine oxide comprises a mono acyl phosphine oxide, such as 2,4,6-trimethylbenzoyl-diphenyl-phosphine oxide. In this embodiment, the phosphine oxide may be augmented with a ketone, such as 2-hydroxy-2-methyl-1-phenyl-propan-1-one and/or 1-hydroxy-cyclohexyl-phenyl-ketone.

In another preferred embodiment of the present invention, the phosphine oxide comprises a bis acyl phosphine oxide, such as bis(2,4,6-trimethylbenzoyl)-phenylphosphine oxide and/or bis(2,6-dimethoxybenzoyl)-2,4,4-trimethyl pentylphosphine oxide. In this embodiment, the phosphine oxide may be augmented with a ketone, such as 2-hydroxy-2-methyl-1-phenyl-propan-1-one and/or 1-hydroxy-cyclohexyl-phenyl-ketone.

In accordance with the present invention, the cathodic material may comprise, for example, a viologen, ferrocinium species, etcetera, and the anodic material may comprise, for example, phenazine, a substituted phenazine, etcetera. In this embodiment, the concentration of the anodic and/or cathodic materials preferably range from approximately 1 mM to approximately 500 mM, and more preferably from approximately 2 mM to approximately 100 mM.

In yet another preferred embodiment of the present invention, the electrochromic medium further comprises a cross-linked polymer matrix, free-standing gel, and/or substantially non-weeping gel.

These and other objectives of the present invention will become apparent in light of the present specification, claims, and drawings.

BRIEF DESCRIPTION OF THE DRAWINGS

The invention will now be described with reference to the drawings wherein.

DETAILED DESCRIPTION OF THE INVENTION

Figure 1:
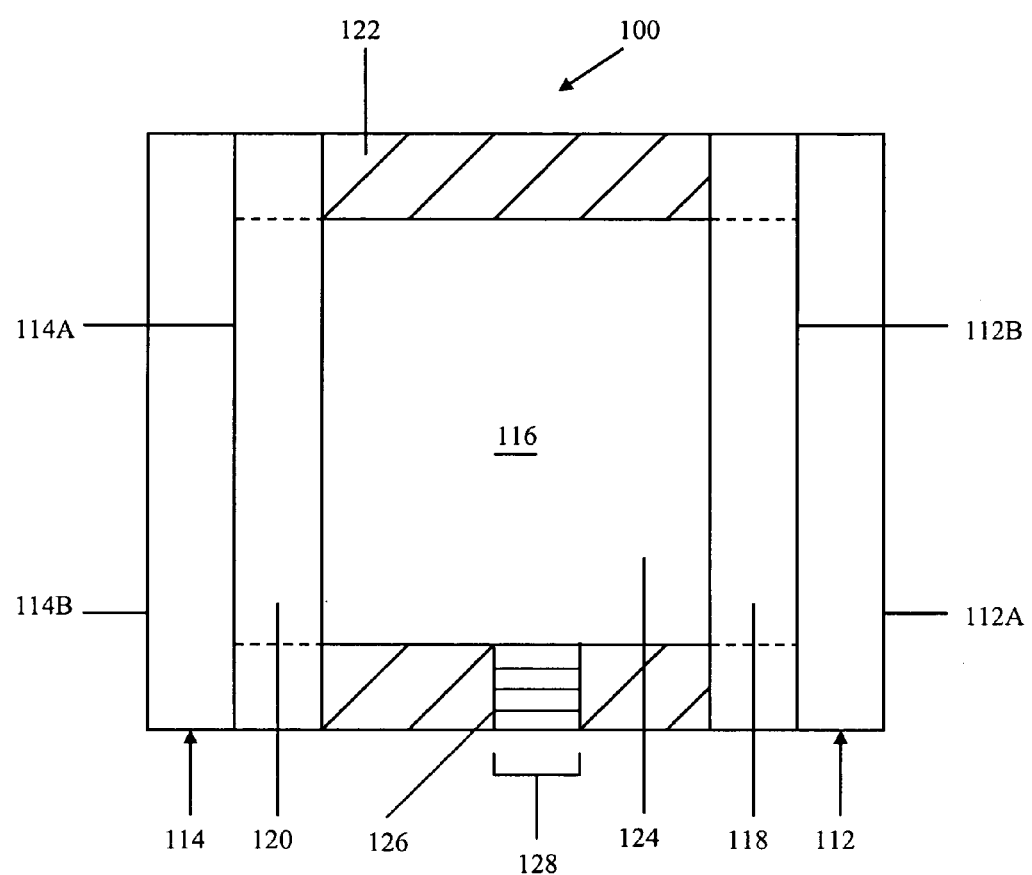
FIG. 1 of the drawings is a cross-sectional schematic representation of an electrochromic device fabricated in accordance with the present invention showing, among other things, a plug associated with a fill port.

Referring now to the drawings and to FIG. 1 in particular, a cross-sectional schematic representation of electrochromic device 100 is shown, which generally comprises first substrate 112 having front surface 112A and rear surface 112B, second substrate 114 having front surface 114A and rear surface 114B, chamber 116 for containing electrochromic medium 124, and plug 126 associated with fill port 128. It will be understood that electrochromic device 100 may comprise, for illustrative purposes only, a window, a mirror, a display device, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625 entitled "Electrochromic Rearview Mirror Incorporating A Third Surface Metal Reflector," U.S. Pat. No. 6,597,489 entitled "Electrode Design For Electrochromic Devices," and U.S. Pat. No. 6,700,692 entitled "Electrochromic Rearview Mirror Assembly Incorporating A Display/Signal Light, all of which are hereby incorporated herein by reference in their entirety including all references incorporated therein.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun.

Second substrate 114 may be fabricated from similar materials as that of first substrate 112. However, if the electrochromic device is a mirror or comprises a mirrored surface, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered, heat strengthened, and/or chemically strengthened, prior to or subsequent to being coated with layers of electrically conductive material (118 and 120).

One or more layers of electrically conductive material 118 are associated with rear surface 112B of first substrate 112. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide or other materials known to those having ordinary skill in the art.

Electrically conductive material 120 is preferably associated with front surface 114A of second substrate 114, and is operatively bonded to electrically conductive material 118 by sealing member 122. As can be seen in FIG. 1, once bonded, sealing member 122 and the juxtaposed portions of electrically conductive materials 118 and 120 serve to define an inner peripheral geometry of chamber 116. Alternatively, edge sealing techniques may be utilized which are disclosed in U.S. patent application Ser. No. 11/066,903 entitled "Vehicular Rearview Mirror Elements And Assemblies Incorporating These Elements," filed on Feb. 25, 2005, which is hereby incorporated herein by reference in its entirety—including the associated priority documents.

Electrically conductive material 120 may vary depending upon the intended use of the electrochromic device. For example, if the electrochromic device is a mirror, then the material may comprise a transparent conductive coating similar to electrically conductive material 118 (in which case a reflector is associated with rear surface 114B of second substrate 114). Alternatively, electrically conductive material 120 may comprise a layer of reflective material in accordance with the teachings of previously referenced and incorporated U.S. Pat. No. 5,818,625. In this case, electrically conductive material 120 is associated with front surface 114A of second substrate 114. Typical coatings for this type of reflector include chromium, rhodium, ruthenium, silver, silver alloys, and combinations thereof.

Sealing member 122 may comprise any material that is capable of being adhesively bonded to the electrically conductive materials 118 and 120 to, in turn, seal chamber 116, in cooperation with plug 126 and fill port 128, so that electrochromic medium 124 does not inadvertently leak out of the chamber. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334, entitled "Electrochromic Device Having A Seal Including An Epoxy Resin Cured With A Cycloaliphatic Amine," all of which are hereby incorporated herein by reference in their entirety.

For purposes of the present disclosure, and as will be explained in greater detail herein below, electrochromic medium 124 typically comprises at least one solvent, at least one anodic material, and at least one cathodic material.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in the ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety.

The anodic and cathodic materials may also be combined or linked by a bridging unit as described in U.S. Pat. No. 6,241,916 entitled "Electrochromic System" and/or U.S. Patent Publication No. 2002/00152214 A1 entitled "Electrochromic Device," which are hereby incorporated herein by reference in their entirety. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," the entirety of which is hereby incorporated herein by reference.

Additionally, a single-layer, single-phase medium may include a medium where the anodic and cathodic materials are incorporated into a polymer matrix as is described in International Patent Application Serial No. PCT/WO99/02621 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety.

(2) Multi-layer—The medium may be made up in layers and includes a material attached directly to an electrically conducting electrode or confined in close proximity thereto which remains attached or confined when electrochemically oxidized or reduced.

(3) Multi-phase—One or more materials in the medium undergoes a change in phase during the operation of the device, for example a material contained in solution in the ionically conducting electrolyte forms a layer on the electrically conducting electrode when electrochemically oxidized or reduced.

In addition, electrochromic medium 124 may comprise other materials, such as light absorbers, light stabilizers, thermal stabilizers, antioxidants, thickeners, viscosity modifiers, tint providing agents, redox buffers, and mixtures thereof. Suitable UV-stabilizers may include: the material 2-ethyl-2-cyano-3,3-diphenyl acrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; the material 2-hydroxy-4-methoxybenzophenone sold by American Cyanamid under the trademark Cyasorb UV 9; and the material 2-ethyl-2'-ethoxyalanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis (butyltriethylammonium)-para-methoxytriphenodithiazine (TPDT)—see synthesis of 3,10-dimethoxy-7,14-(triethylammoniumbutyl)-triphenodithiazine bis(tetrafluoroborate) in U.S. Pat. No. 6,710,906 B2, which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 B1 entitled "Color-Stabilized Electrochromic Devices," and U.S. Pat. No. 6,710,906 B2 entitled "Controlled Diffusion Coefficient Electrochromic Materials For Use In Electrochromic Mediums And Associated Electrochromic Devices," all of which are hereby incorporated herein by reference in their entirety.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butyl-ferrocinium)hexyl)triethylammonium di-tetrafluoroborate (TTBFc$^+$)—see U.S. patent application Ser. No. 10/681,538 entitled "Reversible Electrodeposition Devices And Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L. A. Summers (Academic Press 1980). While specific cathodic materials have been provided for illustrative purposes only, numerous other conventional cathodic materials are likewise contemplated for use including, but by no means limited to, those disclosed in previously referenced and incorporated U.S. Pat. No. 4,902,108, U.S. Pat. No. 6,188,505, and U.S. Pat. No. 6,710,906 B2. Moreover, it is contemplated that the cathodic material may comprise a polymer film, such as various substituted polythiophenes, polymeric viologens, an inorganic film, or a solid transition metal oxide, including, but not limited to, tungsten oxide.

For illustrative purposes only, the concentration of the anodic and cathodic materials can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing electrochromic medium 124.

For purposes of the present disclosure, a solvent of electrochromic medium 124 may comprise any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In accordance with the present invention plug 126 is associated with fill port 128, which comprises an acrylic adhesive and which is at least partially cured with a phosphine oxide photo initiator and/or comprises a phosphine oxide to ensure that plug 126 is properly cured so that any materials of electrochromic medium 124 do not inadvertently leak out of chamber 116 through fill port 128.

It will be understood that during normal fabrication of electrochromic device 100, fill port 128 is utilized to introduce electrochromic medium 124 into chamber 116 of electrochromic device 100. In particular, partially fabricated electrochromic device 100 is typically placed with fill port 128 down in an empty container or trough in a vacuum vessel and evacuated. Electrochromic medium 124 is introduced into the trough or container in a manner such that fill port 128 is submerged. The vacuum vessel is then backfilled, which forces electrochromic medium 124 through fill port 128 and, ultimately, into chamber 116. Fill port 128 is then plugged with a photo curing adhesive, (i.e. plug 126) which comprises a phosphine oxide photo initiator for subsequent curing via a light source, such as a UV lamp. Additional discussion relative to the fabrication process of electrochromic device 100 is disclosed in U.S. Pat. No. 6,700,692, B2, which has been previously referenced and incorporated herein.

In one embodiment of the present invention, the formulation of plug 126 comprises one or more phosphine oxide photo initiators, which as will be verified experimentally herein below, facilitates a more complete cure of the same, which, in turn, increases plug reliability towards minimization and/or elimination of plug failure. For purposes of the present disclosure, the phosphine oxides may be represented by one or more of the following formulae:

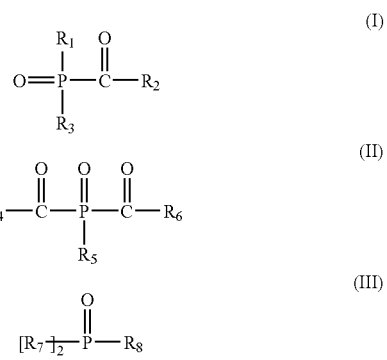

wherein $R_1$–$R_8$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof.

For clarification purposes, and to eliminate any ambiguity associated with nomenclature, some specific examples of phosphine oxide photo initiators for use in the present invention include:

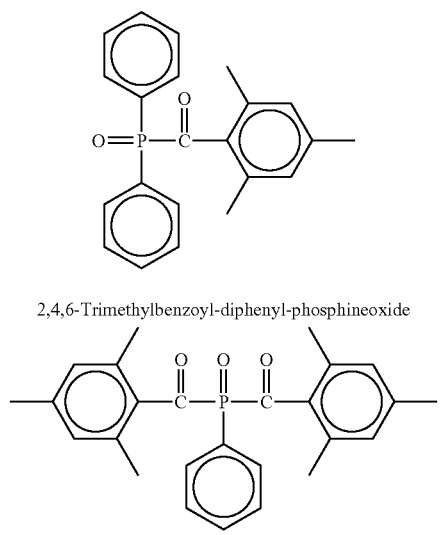

2,4,6-Trimethylbenzoyl-diphenyl-phosphineoxide

Bis(2,4,6-trimethylbenzoyl)-phenylphosphineoxide

-continued

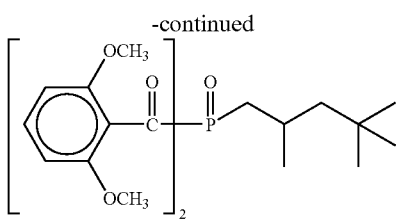

Bis(2,6-dimethoxybenzoyl)-2,4,4-trimethyl-pentylphosphineoxide

While specific phosphine oxide photo initiators have been disclosed, for illustrative purposes only, it will be understood that any one of a number of phosphine oxide photo initiators are contemplated for use in accordance with the present invention.

In another embodiment of the present invention, the formulation of plug 126 comprises one or more phosphine oxide photo initiators mixed with an additional curing additive, such as, for example a carbonyl. Specifically, and as will be verified experimentally herein below, ketones have proven be synergistically beneficial. By way of example only, and to eliminate any ambiguity associated nomenclature, some specific examples of additional curing additives for use in the present invention include:

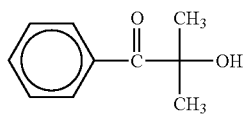

2-Hydroxy-2-methyl-1-phenyl-propan-1-one

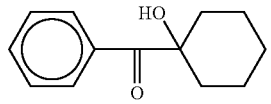

1-Hydroxy-cyclohexyl-phenyl-ketone

It will be understood that while specific additional curing additives have been disclosed, for illustrative purposes only, it will be understood that any one of a number of additional curing additives are contemplated for use in accordance with the present invention—so long as the particular additional curing additive augments the curing properties of the associated phosphine oxide photo initiator.

Without being bound to any one particular theory, it is believed that both the anodic and cathodic materials, possibility as well as other electrochromic medium components, can adversely affect curing of plug 126, which, ultimately, can result in undesirable, premature plug failure and, in turn, device failure—the consequences of which have been previously discussed herein.

Electrochromic devices of the present invention can be used in a wide variety of applications wherein the transmitted or reflected light/heat can be modulated. Such devices include mirrors; windows for the exterior of a building, home or vehicle; skylights for buildings including tubular light filters; windows in office or room partitions; and light filters for photographic devices and light sensors.

The electrochromic media of the present invention utilize many different materials, the preparation and/or commercially available sources are provided herein, unless the material is well known in the art. It will be understood that, unless specified otherwise, the starting reagents are commercially available from Aldrich Chemical Co., of Milwaukee, Wis., Ciba-Geigy Corp., and/or other common chemical suppliers. It will be further understood that conventional chemical abbreviations will be used when appropriate including the following: grams (g); milliliters (mL); moles (mol); millimoles (mmol); molar (M); millimolar (mM); pounds per square inch (psi); hours (h); and degrees Centigrade (° C.).

In support of the present invention, multiple experiments were conducted wherein increased plug curing, and, in turn, reliability using phosphine oxide photo initiators, either alone, or in combination with an additional curing additive, was validated.

Experimental Procedure

In each of the experiments a blend of acrylic monomers and oligomers (i.e. the pre-cured adhesive plug formulation) was used as is provided in Table I.

TABLE I

| Material | Weight % |
| --- | --- |
| Hydroxypropyl Methacrylate (Aldrich) | 30 |
| BR-3042 (Bomar) | 25 |
| BR-571 (Bomar) | 20 |
| Isobornyl Acrylate (Aldrich) | 20 |
| TS-720 Fumed Silica (Degussa) | 5 |

Unless otherwise indicated the electrochromic fluid utilized in each experiment was formulated in accordance with Table II.

TABLE II

| | Concentration |
| --- | --- |
| Cathodic Fluid | |
| Octylviologen $BF_4$ | 38 mM |
| Polymethylmethacrylate (PMMA) | 3% by weight (thickener) |
| Propylene carbonate (PC) | Solvent |
| Anodic Fluid | |
| 5,10-Dimethylphenazine (DMP) | 27 mM |
| Polymethylmethacrylate (PMMA) | 3% by weight (thickener) |
| Propylene carbonate (PC) | solvent |

Next, a photo initiator (PI) was added at 2% by weight of the resin blend (i.e. 10.0 g acrylic base to 0.20 g of PI). Almost all PI's are recommended to be used at a loading concentration of approximately 1% to approximately 4%. However, it will be understood that other loading concentrations are contemplated for use in accordance with the present invention, To be sure, other loading concentrations may be necessary depending upon the intended use of the electrochromic device—e.g. some PI's cause yellowing of a coating, and thus, one would want to minimize its use for a decorative coating. Also, at some concentration cost can become an issue for commercial purposes.

Next 20% by weight of the electrochromic fluid was added to each adhesive (i.e. plug) sample. Next, the electrochromic fluid and the adhesive formulation were each mixed thoroughly. Then a drop of each adhesive/electrochromic fluid mixture was placed onto a first glass slide coated with a metallic reflector (as per U.S. Pat. No. 5,818, 625—which has been incorporated by reference infra). A few spacer beads were sprinkled onto the adhesive/electrochromic fluid mixture, and a second piece of glass coated with a layer of transparent conductive oxide (½ wave ITO) was placed on the first glass slide. Next, each sample was cured for 1 minute under a flood UV system. After exposure to UV radiation, each sample was then placed in an upright position. If the glass plates remained in place, the sample passed, however, if the glass plates slid (i.e. the material was not properly cured) the sample was deemed to have failed. 20% by weight was added until either the adhesive/electrochromic fluid mixture reached 100% by weight (i.e. a 50/50 weight percent blend of fluid and adhesive) or the mixture failed. A summary of the result are provided in Table III.

TABLE III

| Photo Initiator | Commercial Source | Pass/Fail (Loading %) |
| --- | --- | --- |
| Darocur TPO (MAPO) | Ciba-Geigy | Pass at 100% |
| Irgacure 1700 (PO blend) | Ciba-Geigy | Pass at 100% |
| Irgacure 1800 (PO blend) | Ciba-Geigy | Pass at 100% |
| Irgacure 1850 (PO blend) | Ciba-Geigy | Pass at 100% |
| Irgacure 819 (BAPO) | Ciba-Geigy | Pass at 100% |
| Darocur 4265 (PO blend) | Ciba-Geigy | Fail at 80% |
| Genocure LTM (PO blend) | Rahn | Fail at 80% |
| Genocure MBF (benzyl formate) | Rahn | Fail at 20% |
| Genocure CQ (camphor guinone) | Rahn | Fail at 20% |
| Esacure KIP 100F (polymeric hydroxy ketone) | Sartomer | Fail at 40% |
| Esacure 1124 (ITX) | Sartomer | Fail at 20% |
| Irgacure 651 (BDK) - Prior Art | Ciba-Geigy | Fail at 20% |
| Irgacure 500 (benzophenone blend) | Ciba-Geigy | Fail at 20% |
| Irgacure 184 (hydroxy ketone) | Ciba-Geigy | Fail at 40% |
| Darocur 1173 (hydroxy ketone) | Ciba-Geigy | Fail at 40% |
| Irgacure 784 (Ti metallocene) | Ciba-Geigy | Fail at 20% |
| Irgacure 2959 (amino ketone) | Ciba-Geigy | Fail at 20% |
| Irgacure 369 (amino ketone) | Ciba-Geigy | Fail at 40% |
| Irgacure 907 (amino ketone) | Ciba-Geigy | Fail at 40% |

As can be clearly seen from the experimental results above, both the homogenous and blended phosphine oxide photo initiators exhibited superior unexpected, curing results as compared to the present state of the art (651—BDK) as well as many other free radical based photo initiators, which, in turn, facilitates enhanced reliability of the same.

For purposes of the present disclosure, the plug formulation or material may further comprise a filler material having a refractive index similar to the refractive index of the electrochromic fluid and/or medium. In particular, a manufacturing process of placing the plug or plug material into the port opening can be aided with a white and/or hazy appearing plug material. It will be understood that a hazy and/or white plug material can produce a contrast between the plug material and the electrochromic fluid and/or medium which is usually clear and transparent. Such a contrast can materially aid in the controlled injection of the plug material because the position of the interface between the plug material and the electrochromic fluid and/or medium can be easily seen. Typically, the plug material is injected into the fill port in an uncured state. This injection process can result in some of the uncured plug material dissolving into the electrochromic fluid and/or medium. If an insoluble filler material is used with a dissimilar refractive index compared to the electrochromic fluid and/or medium, the undissolved filler material can produce a haze or other visible defects that are aesthetically objectionable in the viewing area of an associated mirror. However, if a filler material with a similar refractive index to the electrochromic fluid is used, it is less likely to produce haze and/or other visible defects because light will not be refracted by the filler particles. By way of example, one filler material that has a similar refractive index to the electrochromic fluid and/or medium but not the plug formulation or material (i.e. glue) is calcium fluoride.

It has been observed that the addition of between approximately two and approximately 5% of CA-500 (Atlantic Equipment Engineers, Bergenfield, N.J.) to the glue renders the same hazy in appearance. However, when the glue dissolves into the electrochromic fluid and/or medium, the undissolved calcium fluoride particles remaining in the electrochromic fluid are not objectionably visible. Preferably the refractive index (RI) difference between the electrochromic fluid and/or medium and the filler material is +/−0.030, and more preferably between +/−0.010.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic device, comprising:
   a first substantially transparent substrate having an electrically conductive material associated therewith;
   a second substrate having an electrically conductive material associated therewith;
   an electrochromic medium contained within a chamber positioned between the first and second substrates which comprises:
   at least one solvent;
   at least one anodic material;
   at least one cathodic material, wherein both of the anodic and cathodic materials are electroactive and at least one of the anodic and cathodic materials is electrochromic;
   wherein the chamber comprises a plug associated with a fill port; and
   wherein the plug comprises a phosphine oxide.

2. The electrochromic device according to claim 1, wherein the phosphine oxide comprises a mono acyl phosphine oxide.

3. The electrochromic device according to claim 1, wherein the phosphine oxide comprises 2,4,6-trimethylbenzoyl-diphenyl-phosphine oxide.

4. The electrochromic device according to claim 3, wherein the plug further comprises 2-hydroxy-2-methyl-1-phenyl-propan-1-one.

5. The electrochromic device according to claim 1, wherein the phosphine oxide comprises a bis acyl phosphine oxide.

6. The electrochromic device according to claim 1, wherein the phosphine oxide comprises bis(2,4,6-trimethylbenzoyl)-phenylphosphine oxide.

7. The electrochromic device according to claim 1, wherein the phosphine oxide comprises bis(2,6-dimethoxybenzoyl)-2,4,4-trimethyl pentylphosphine oxide.

8. The electrochromic device according to claim 7, wherein the plug further comprises 2-hydroxy-2-methyl-1-phenyl-propan-1-one.

9. The electrochromic device according to claim 7, wherein the plug further comprises 1-hydroxy-cyclohexyl-phenyl-ketone.

10. The electrochromic device according to claim 1, wherein the phosphine oxide comprises at least one of the following formulae:

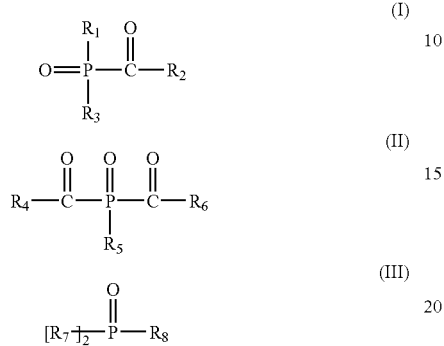

wherein $R_1$–$R_8$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof.

11. The electrochromic device according to claim 10, wherein the plug further comprises a ketonic augmentive additive.

12. The electrochromic device according to claim 1, wherein the cathodic material comprises a viologen.

13. The electrochromic device according to claim 1, wherein the cathodic material comprises a ferrocinium species.

14. The electrochromic device according to claim 1, wherein the anodic material comprises phenazine.

15. The electrochromic device according to claim 1, wherein the anodic material comprises a substituted phenazine.

16. The electrochromic device according to claim 1, wherein the concentration of the cathodic material ranges from approximately 1 mM to approximately 500 mM.

17. The electrochromic device according to claim 1, wherein the concentration of the cathodic material ranges from approximately 2 mM to approximately 100 mM.

18. The electrochromic device according to claim 1, wherein the concentration of the anodic material ranges from approximately 1 mM to approximately 500 mM.

19. The electrochromic device according to claim 1, wherein the concentration of the anodic material ranges from approximately 2 mM to approximately 100 mM.

20. The electrochromic device according to claim 1, wherein the electrochromic medium further comprises a cross-linked polymer matrix.

21. The electrochromic device according to claim 1, wherein the electrochromic medium further comprises a free-standing gel.

22. The electrochromic device according to claim 1, wherein the device is an electrochromic window.

23. The electrochromic device according to claim 1, wherein the second substrate is coated with a reflective material.

24. The electrochromic device according to claim 23, wherein the device is an electrochromic mirror.

25. The electrochromic device according to claim 1, wherein the plug includes a filler material having a refractive index substantially similar to the refractive index of the electrochromic medium.

26. The electrochromic device according to claim 25, wherein the difference in refractive index between the filler material and the electrochromic medium is approximately +/−0.030.

27. The electrochromic device according to claim 26, wherein the difference in refractive index between the filler material and the electrochromic medium is approximately +/−0.010.

28. An electrochromic device, comprising:
a first substantially transparent substrate having an electrically conductive material associated therewith;
a second substrate having an electrically conductive material associated therewith;
an electrochromic medium contained within a chamber positioned between the first and second substrates which comprises:
at least one solvent;
at least one anodic material;
at least one cathodic material, wherein both of the anodic and cathodic materials are electroactive and at least one of the anodic and cathodic materials is electrochromic;
wherein the chamber comprises a plug associated with a fill port; and
wherein the plug is at least partially cured with a phosphine oxide photo initiator.

29. The electrochromic device according to claim 28, wherein the phosphine oxide comprises a mono acyl phosphine oxide.

30. The electrochromic device according to claim 28, wherein the phosphine oxide comprises 2,4,6-trimethylbenzoyl-diphenyl-phosphine oxide.

31. The electrochromic device according to claim 30, wherein the plug further comprises 2-hydroxy-2-methyl-1-phenyl-propan-1-one.

32. The electrochromic device according to claim 28, wherein the phosphine oxide comprises a bis acyl phosphine oxide.

33. The electrochromic device according to claim 28, wherein the phosphine oxide comprises bis(2,4,6-trimethylbenzoyl)-phenylphosphine oxide.

34. The electrochromic device according to claim 28, wherein the phosphine oxide comprises bis(2,6-dimethoxybenzoyl)-2,4,4-trimethyl pentylphosphine oxide.

35. The electrochromic device according to claim 34, wherein the plug further comprises 2-hydroxy-2-methyl-1-phenyl-propan-1-one.

36. The electrochromic device according to claim 34, wherein the plug further comprises 1-hydroxy-cyclohexyl-phenyl-ketone.

37. The electrochromic device according to claim 28, wherein the phosphine oxide comprises at least one of the following formulae:

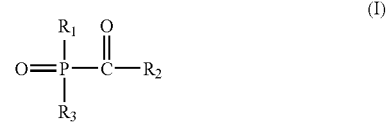

-continued

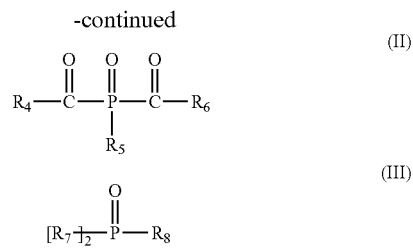

wherein $R_1$–$R_8$ are the same or different and comprise H, a hydroxyl group, a straight or branched alkyl, cycloalkyl, polycycloalkyl, heterocycloalkyl, alkaryl, alkoxy, aryl, aralkyl, alkenyl, alkynyl, or carbonyl group containing approximately 1 to approximately 50 carbon atom(s) and combinations thereof.

38. The electrochromic device according to claim 37, wherein the plug further comprises a ketonic augmentive additive.

39. The electrochromic device according to claim 28, wherein the cathodic material comprises a viologen.

40. The electrochromic device according to claim 28, wherein the cathodic material comprises a ferrocinium species.

41. The electrochromic device according to claim 28, wherein the anodic material comprises phenazine.

42. The electrochromic device according to claim 28, wherein the anodic material comprises a substituted phenazine.

43. The electrochromic device according to claim 28, wherein the concentration of the cathodic material ranges from approximately 1 mM to approximately 500 mM.

44. The electrochromic device according to claim 28, wherein the concentration of the cathodic material ranges from approximately 2 mM to approximately 100 mM.

45. The electrochromic device according to claim 28, wherein the concentration of the anodic material ranges from approximately 1 mM to approximately 500 mM.

46. The electrochromic device according to claim 28, wherein the concentration of the anodic material ranges from approximately 2 mM to approximately 100 mM.

47. The electrochromic device according to claim 28, wherein the electrochromic medium further comprises a cross-linked polymer matrix.

48. The electrochromic device according to claim 28, wherein the electrochromic medium further comprises a free-standing gel.

49. The electrochromic device according to claim 28, wherein the electrochromic medium further comprises a substantially non-weeping gel.

50. The electrochromic device according to claim 28, wherein the device is an electrochromic window.

51. The electrochromic device according to claim 28, wherein the second substrate is coated with a reflective material.

52. The electrochromic device according to claim 51, wherein the device is an electrochromic mirror.

53. The electrochromic device according to claim 28, wherein the plug includes a filler material having a refractive index substantially similar to the refractive index of the electrochromic medium.

54. The electrochromic device according to claim 53, wherein the difference in refractive index between the filler material and the electrochromic medium is approximately +/−0.030.

55. The electrochromic device according to claim 54, wherein the difference in refractive index between the filler material and the electrochromic medium is approximately +/−0.010.

56. An electrochromic device, comprising:
at least one substantially transparent substrate having an electrically conductive material associated therewith; and
an electrochromic medium contained within a chamber positioned between the first and second substrates which comprises:
at least one solvent;
at least one anodic material;
at least one cathodic material, wherein both of the anodic and cathodic materials are electroactive and at least one of the anodic and cathodic materials is electrochromic;
wherein the chamber comprises a plug associated with a fill port; and
wherein the plug comprises a phosphine oxide.

57. An electrochromic device, comprising:
at least one substantially transparent substrate having an electrically conductive material associated therewith; and
an electrochromic medium contained within a chamber positioned between the first and second substrates which comprises:
at least one solvent;
at least one anodic material;
at least one cathodic material, wherein both of the anodic and cathodic materials are electroactive and at least one of the anodic and cathodic materials is electrochromic;
wherein the chamber comprises a plug associated with a fill port; and
wherein the plug is at least partially cured with a phosphine oxide photo initiator.

* * * * *